(12) United States Patent
Kim et al.

(10) Patent No.: US 10,901,467 B2
(45) Date of Patent: Jan. 26, 2021

(54) ELECTRONIC DEVICE WITH HINGE ASSEMBLY

(71) Applicant: Samsung Electronics Co., Ltd., Gyeonggi-do (KR)

(72) Inventors: Haesoo Kim, Gyeonggi-do (KR); Kichul Namgung, Gyeonggi-do (KR); Minjun Kim, Gyeonggi-do (KR); Yongbum Ha, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/407,795

(22) Filed: May 9, 2019

(65) Prior Publication Data

US 2019/0346890 A1 Nov. 14, 2019

(30) Foreign Application Priority Data

May 9, 2018 (KR) .......................... 10-2018-0053351

(51) Int. Cl.
*G06F 1/16* (2006.01)
*E05D 11/00* (2006.01)
*E05F 15/611* (2015.01)
*F16C 11/04* (2006.01)

(52) U.S. Cl.
CPC ............ *G06F 1/1681* (2013.01); *E05D 11/00* (2013.01); *E05F 15/611* (2015.01); *F16C 11/04* (2013.01); *G06F 1/1616* (2013.01); *G06F 1/1677* (2013.01); *E05Y 2201/434* (2013.01); *E05Y 2900/606* (2013.01)

(58) Field of Classification Search
CPC .... G06F 1/1616; G06F 1/1675; G06F 1/1681; G05B 15/02

USPC ........................................ 361/679.26, 679.27
See application file for complete search history.

(56) References Cited

U.S. PATENT DOCUMENTS

| | | | |
|---|---|---|---|
| 7,093,702 B2* | 8/2006 | Takumori | G06F 1/1616 192/16 |
| 9,823,631 B1* | 11/2017 | Loo | G05B 15/02 |
| 2004/0090754 A1* | 5/2004 | Takumori | G06F 1/1677 361/755 |
| 2007/0289099 A1* | 12/2007 | Jung | G06F 1/1616 16/354 |

(Continued)

FOREIGN PATENT DOCUMENTS

EP 1 780 987 5/2007

*Primary Examiner* — Anthony Q Edwards
(74) *Attorney, Agent, or Firm* — The Farrell Law Firm, P.C.

(57) ABSTRACT

An electronic device and a hinge assembly are provided. The electronic device includes a main body, a display unit rotatably coupled with the main body, a hinge assembly including a motor assembly disposed on at least a portion of an end thereof and rotatably coupling the display unit to the main body, wherein the hinge assembly further includes a first shaft configured to provide a rotation axis to the display unit, a first connecting member including a first coupling piece coupled to the display unit and a first arm extending from the first coupling piece and sharing the rotation axis with the first shaft, and a second connecting member including a second coupling piece coupled to the main body and a second arm extending from the second coupling piece and sharing the rotation axis with the first shaft, and an adapter connecting the motor assembly with the first shaft.

17 Claims, 8 Drawing Sheets

(56) References Cited

U.S. PATENT DOCUMENTS

| | | | |
|---|---|---|---|
| 2011/0292009 A1* | 12/2011 | Wang | G06F 1/1675 345/207 |
| 2012/0162864 A1* | 6/2012 | Wikander | G06F 1/1681 361/679.01 |
| 2014/0015448 A1* | 1/2014 | Wikander | H04N 5/00 318/3 |
| 2014/0125553 A1* | 5/2014 | Kim | G06F 1/1647 345/1.3 |
| 2018/0039250 A1* | 2/2018 | Liang | G05B 19/402 |

\* cited by examiner

ELECTRONIC DEVICE WITH HINGE ASSEMBLY

CROSS-REFERENCE TO RELATED APPLICATION(S)

This application is based on and claims priority under 35 U.S.C. § 119 to Korean Patent Application No. 10-2018-0053351, filed on May 9, 2018, in the Korean Intellectual Property Office, the disclosure of which is incorporated by reference herein in its entirety.

BACKGROUND

1. Field

The present disclosure relates generally to an electronic device and, more particularly, to an electronic device with a hinge assembly where a main body and a display unit of the electronic device are rotatably coupled together.

2. Description of the Related Art

Typically, the term "electronic device" refers to a device that can be carried by a user, allowing the user to enjoy telecommunications functionality, such as voice call or short messaging service; multimedia functionality, such as playing music or videos; or other entertainment functions, such as playing video games. Such an electronic device may include home or office desktop computers and laptop computers which provide more space availability and portability in general use environments including homes and offices.

A laptop computer may include a display unit visually providing information to the outside (e.g., a user), a keyboard, and a main body receiving parts for displaying screens on the display unit and various control circuits. The display unit and the main body may be rotatably hinged together, allowing the laptop computer a simplified configuration.

Smart home environments, which have recently become popular, require that various functions of electronic devices live up to user expectations for convenience and work efficiency.

For conventional laptop computers, mechanical hinges have typically been adopted to connect a display unit and a main body, which require manual opening and closing by a user which limits convenient user response to various scenarios.

SUMMARY

An aspect of the present disclosure provides a hinge assembly in an electronic device in which a motor assembly is coupled with a mechanical hinge in the hinge assembly, which enables more functionality of the electronic device to be actively implemented and fitting various scenarios demanded by a user.

Another aspect of the present disclosure provides an electronic device that is capable of actively adjusting an angle at which a display unit is open and closed by including a hinge assembly electronically controlled depending on external contexts.

In accordance with an aspect of the present disclosure, an electronic device is provided. The electronic device includes a main body, a display unit rotatably coupled with the main body, a hinge assembly including a motor assembly disposed on at least a portion of an end thereof and configured to rotatably couple the display unit to the main body, wherein the hinge assembly further includes a first shaft configured to provide a rotation axis to the display unit, a first connecting member including a first coupling piece coupled to the display unit and a first arm extending from the first coupling piece and sharing the rotation axis with the first shaft, and a second connecting member including a second coupling piece coupled to the main body and a second arm extending from the second coupling piece and sharing the rotation axis with the first shaft, and an adapter connecting the motor assembly with the first shaft.

In accordance with another aspect of the present disclosure, a hinge assembly is provided. The hinge assembly includes a first shaft configured to provide a rotation axis, a first connecting member including a first coupling piece coupled to a first object and a first arm extending from the first coupling piece and sharing the rotation axis with the first shaft, a second connecting member including a second coupling piece coupled to a second object and a second arm extending from the second coupling piece and sharing the rotation axis with the first shaft, and an adapter connecting the motor assembly with the first shaft, wherein the motor assembly includes a driving motor part, a decelerating part configured to decelerate rotation of the driving motor part, and a driving shaft configured to receive a rotational force of the driving motor part through the decelerating part, wherein the driving shaft is coaxially coupled with the first shaft via the adapter, and wherein the first shaft is configured to rotate with rotation of the driving shaft.

In accordance with another aspect of the present disclosure, an electronic device in a hinge assemble is provided. The electronic device includes a main body, a display unit rotatably coupled with the main body, and the hinge assembly wherein the display unit is rotatably coupled with the main body, a motor assembly sharing a rotation axis with the hinge assembly and including a driving motor part and a decelerating part configured to decelerate rotation of the driving motor part, and a motor controller configured to control the motor assembly, wherein the display unit or the main body includes a first sensor unit configured to detect a motion of an external object and a second sensor unit configured to detect a touch input or a hovering input, wherein the motor controller is further configured to generate a first event to control the motor assembly using information received through the first sensor unit and a second event to control the motor assembly using information received through the second sensor unit.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
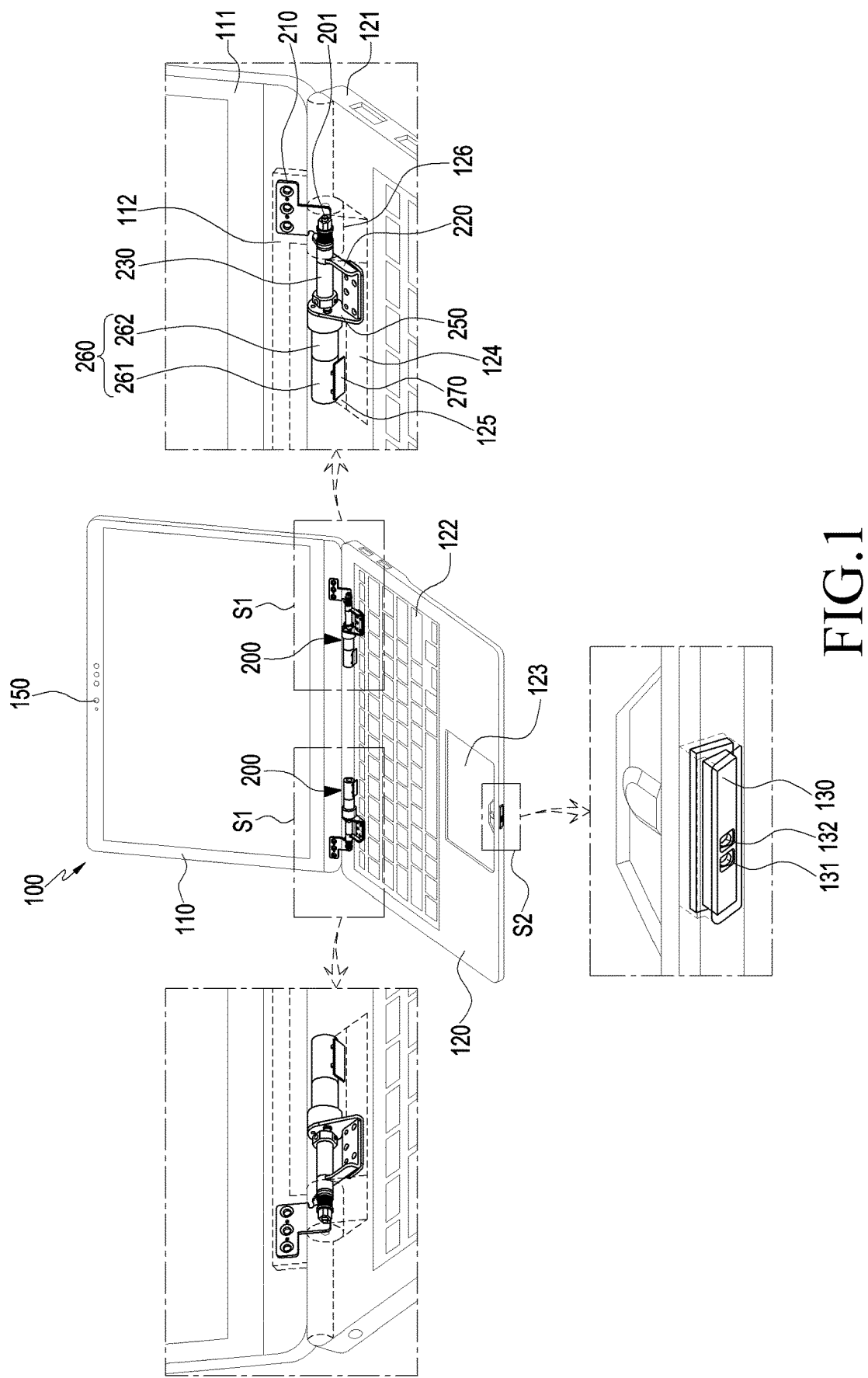
FIG. 1 is an illustration of an electronic device, according to an embodiment.

Hereinafter, embodiments of the present disclosure are described with reference to the accompanying drawings. However, it should be appreciated that the present disclosure is not limited to the embodiments and the terminology used herein, and all changes and/or equivalents or replacements thereto are also intended to belong to the scope of the present disclosure, as defined by the appended claims and their equivalents. The same or similar reference denotations may be used to refer to the same or similar elements throughout the present disclosure and the accompanying drawings. It is to be understood that the singular forms "a," "an," and "the" include plural references unless the context clearly dictates otherwise.

As used herein, the terms "A or B" and "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), the element may be coupled or connected with/to the other element directly or via a third element.

As used herein, the term "configured to" may be interchangeably used with other terms, such as "suitable for," "capable of," "modified to," "made to," "adapted to," "able to," and "designed to" in hardware or software in the context. Rather, the term "configured to" may indicate that a device may perform an operation together with another device or part. For example, the term "processor configured (or set) to perform A, B, and C" may indicate a general-purpose processor (e.g., a central processing unit (CPU) or an application processor) that may perform the operations by executing one or more software programs stored in a memory device or a dedicated processor (e.g., an embedded processor) for performing the operations.

For example, the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), moving picture experts group audio layer 3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync®, Apple TV®, or Google TV™), a gaming console (Xbox®, PlayStation®), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), an avionics device, security devices, vehicular head units, industrial or home robots, drones, automated teller machines (ATMs), point of sale (POS) devices, or Internet of things (IoT) devices (e.g., a light bulb, various sensors, a sprinkler, a fire alarm, a thermostat, a street light, a toaster, fitness equipment, a hot water tank, a heater, or a boiler).

The electronic device may include at least one of part of a piece of furniture, building/structure or vehicle, an electronic board, an electronic signature receiving device, a projector, or various measurement devices (e.g., devices for measuring water, electricity, gas, or electromagnetic waves). The electronic device may be flexible or may be a combination of the above-enumerated electronic devices. However, the electronic device is not intended to be limited to the above-listed embodiments. As used herein, the term "user" may denote a human or another device (e.g., an artificially intelligent electronic device) using the electronic device.

FIG. 1 is an illustration of an electronic device, according to an embodiment.

Referring to FIG. 1, the electronic device 100 may be, e.g., a laptop computer in which a display unit 110 and a main body 120 are rotatably coupled together about each other and may include a hinge assembly 200 to rotatably couple the display unit 110 and the main body 120. The electronic device 100 may include a motor assembly 260 installed in the hinge assembly 200.

The display unit 110 may include a first housing 111 (or a display unit housing) and a display panel installed on the front surface of the first housing 111 and may include various parts including a camera module 150, a proximity illuminance sensor, and a Hall effect sensor.

The main body 120 may include a second housing 121 (or a main body housing) which may receive a main board and a battery therein and on a surface of which a keyboard 122 or a touchpad 123 as an input device may be provided. The main body 120 may include, e.g., a power connector for connection to an external power source and slots for putting a storage medium or external memory.

The display unit 110 may be rotatably coupled to the main body 120 via the hinge assembly 200. For example, the display unit 110 may rotate and unfold at a predetermined angle from a folded position where the display unit 110 faces the main body 120.

The hinge assembly 200 may include a first shaft 201 that provides a rotation axis when the display unit 110 rotates about the main body 120. Accordingly, the display unit 110 may be rotatably coupled to the main body 120 using the first shaft 201. The first shaft 201 may extend in parallel with the lengthwise direction of the hinge assembly 200 and in parallel with the horizontal edges of the display unit 110 and the main body 120.

The hinge assembly 200 may include a first connecting member 210 connected to the display unit 110 and a second connecting member 220 connected to the main body 120. The first connecting member 210 and the second connecting member 220 may be firmly connected to the display unit 110 and the main body 120, respectively, via screws, bolts, rivets, or other various coupling schemes.

At least a part of the hinge assembly 200 may be received in the display unit 110 and at least another part thereof may be received in the main body 120. The first connecting member 210 may be seated on a first base 112 prepared inside the first housing 111. The second connecting member 220 may be seated on a second base 124 prepared inside the second housing 121, and the first shaft 201 may be seated on a third base 125 prepared inside the second housing 121. The first base 112 may be integrally formed with the first housing 111, and the second base 124 and the third base 125 may be integrally formed with the second housing 121. The first base 112, the second base 124, and the third base 125 may be bases or spaces positioned on the rear surfaces of the first connecting member 210, the second connecting member 220, and the first shaft 201, respectively. The second base 124 and the third base 125 may be bases or spaces positioned adjacent to each other.

The hinge assembly 200 may include a motor assembly 260 at a side of the hinge assembly 200 and an adapter 230 connecting the motor assembly 260 and the first shaft 201. The motor assembly 260 and the adapter 230 may be seated on the third base 125 prepared inside the second housing 121. Thus, the first shaft 201, the adapter 230, and the motor assembly 260 may sequentially be arranged in one direction along the third base 125.

The first shaft 201 may be at least partially received in a hinge arm 126 prepared inside the main body 120. The hinge arm 126 may be a portion extending from the first housing 111 or the second housing 121 and may be a component that is led from an edge of the second housing 121 to the inside of the main body 120. At least part of the first shaft 201, e.g., an end of the first shaft 201, may be inserted into a space formed inside the hinge arm 126. The end of the first shaft 201 may be fixed to and supported by the hinge arm 126.

One hinge may be provided in the electronic device 100 or, as shown in FIG. 1, a pair of hinges may be provided in the electronic device 100. When a pair of hinges is provided in the electronic device 100, the motor assembly 260 may be coupled to both or only one of the two hinges.

The electronic device 100 may include a plurality of sensor units (e.g., first sensor units 130). For example, as shown in FIG. 1, the first sensor units 130 may be formed on a surface of the second housing 121 and positioned ahead of the touch pad 123 to sense an approach of an external object (e.g., a user). The plurality of sensor units or modules is described below in greater detail with reference to FIGS. 6, 7, and 8.

Figure 2:
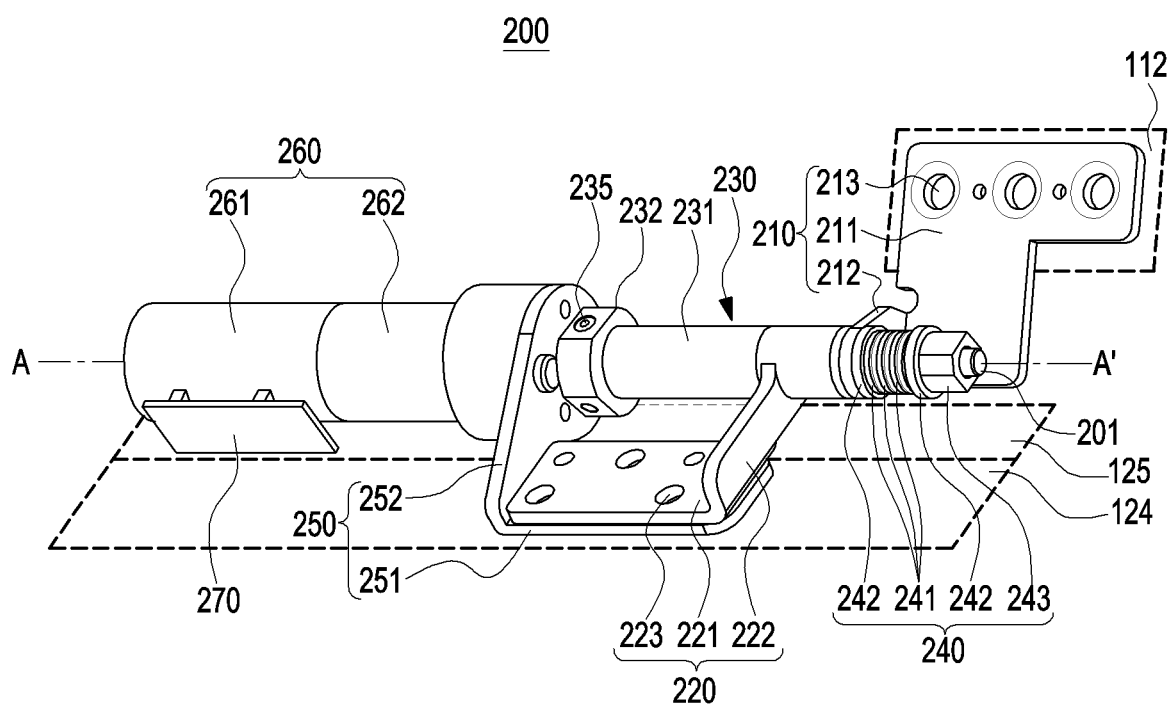
FIG. 2 is a perspective view of a hinge assembly, according to an embodiment.

FIG. 2 is a perspective view of the hinge assembly, according to an embodiment.

Referring to FIG. 2, an area where the hinge assembly 200 is disposed may be indicated by dashed lines. A portion (e.g., a first connecting member 210) of the hinge assembly 200 may be positioned on a first base 112, another portion (e.g., a second connecting member 220) of the hinge assembly 200 may be positioned on a second base 124, and yet another portion (e.g., a first shaft 201, an adapter 230, and a motor assembly 260) of the hinge assembly 200 may be positioned on a third base 125.

The first shaft 201 included in the hinge assembly 200 may provide a rotation axis to a display unit 110. For example, the display unit 110 may be rotated about the rotation axis, i.e., the first shaft 201 extending along line A-A' shown in FIG. 2.

A first connecting member 210 and a second connecting member 220 may be connected around the first shaft 201. The first connecting member 210 may include a first coupling piece 211 coupled to the display unit 110 and a first arm 212 extending from the first coupling piece 211 and sharing the rotation axis with the first shaft 201, and the second connecting member 220 may include a second coupling piece 221 coupled to the main body 120 and a second arm 222 extending from the second coupling piece 221 and sharing the rotation axis with the first shaft 201. The first arm 212 may be perpendicular to an end of the first coupling piece 211, and the second arm 222 may be perpendicular to an end of the second coupling piece 221. The first coupling piece 211 and the second coupling piece 221 may be plate-shaped members and may be firmly connected to the display unit 110 and the main body 120, respectively, via at least one coupling scheme of screws, bolts, or rivets. The respective ends of the first arm 212 and the second arm 222 may have through holes where the first shaft 201 is positioned to share the rotation axis. The first arm 212 and the second arm 222 may also be rotated about the first shaft 201.

The motor assembly 260 may be coaxially coupled with the first shaft 201 using the adapter 230. The first arm 212, the second arm 222, the adapter 230, and the motor assembly 260 may be sequentially arranged from an end of the first shaft 201, where such a structure enables the first shaft 201 to rotate in synchronization with the rotation of the motor assembly 260.

The adapter 230 may include a second shaft 231, where one end of which is coaxially coupled with the first shaft 201. Unlike the first shaft 201 having the first arm 212 and the second arm 222 arranged therearound and delivering a rotational force to the first arm 212 or the second arm 222, the second shaft 231 may function to connect the first shaft 201 with the motor assembly 260 along a straight line. Accordingly, the second shaft 231 may be larger in diameter than the first shaft 201. The second shaft 231 may be integrally formed with the first shaft 201.

Figure 3A:
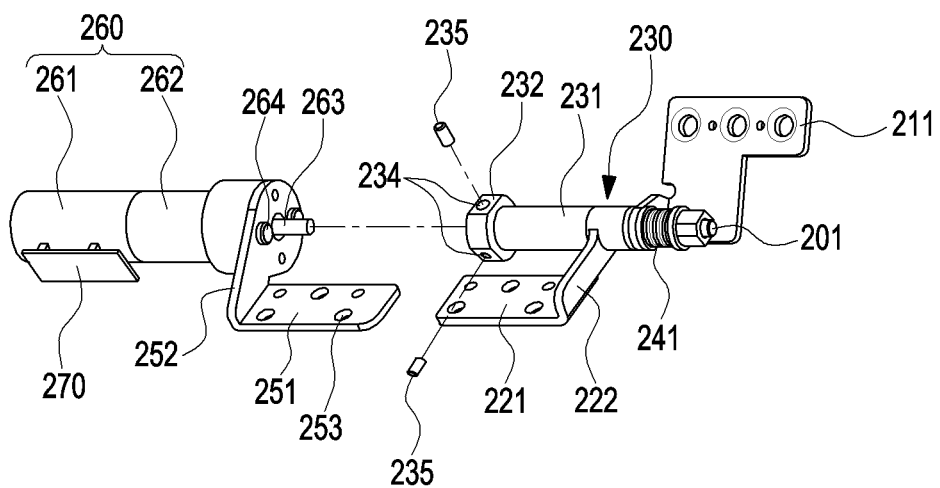
FIG. 3A is an exploded perspective view of a hinge assembly, according to an embodiment.
Figure 3B:
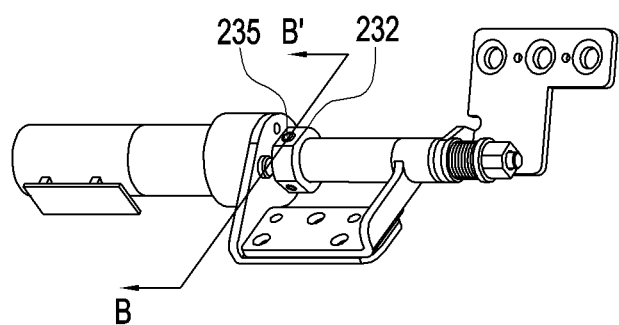
FIG. 3B is a perspective view of the hinge assembly of FIG. 3A, according to an embodiment.
Figure 4A:
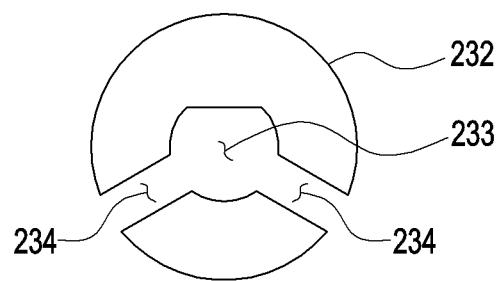
FIG. 4A is a cross-sectional view of FIG. 3B, taken along line B-B', according to an embodiment.
Figure 4B:
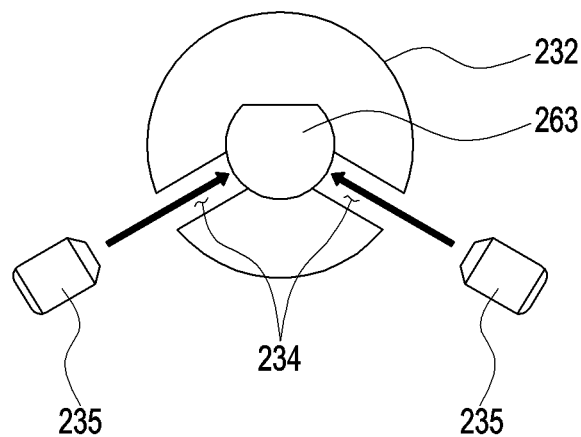
FIG. 4B is an illustration of FIG. 4A, coupled with a driving shaft, according to an embodiment.

FIG. 3A is an exploded perspective view of a hinge assembly, according to an embodiment. FIG. 3B is a perspective view of the hinge assembly of FIG. 3A. FIG. 4A is a cross-sectional view of a motor coupling part 232, taken along line B-B' in FIG. 3B. FIG. 4B is an illustration of FIG. 4A, coupled with a driving shaft 263.

Referring to FIG. 3A, a motor assembly 260 may include a driving motor part 261, a decelerating part 262 for decelerating a rotation of the driving motor part 261, and a driving shaft 263 for receiving a rotational force of the driving motor part 261 via the decelerating part 262. A motor coupling part 232 for mutually coupling the adapter 230 and the motor assembly 260 may be formed at the opposite end of the second shaft 231.

The motor coupling part 232 may be a portion integrally formed in the second shaft 231 to allow its end to connect with the motor assembly 260.

Referring to FIGS. 3B, 4A, and 4B, a shaft coupling hole 233, where the driving shaft 263 of the motor assembly 260 is coaxially coupled with the second shaft 231, may be formed in the center of the motor coupling part 232, and auxiliary coupling holes 234 may be formed which extend from the outer circumference of the motor coupling part 232 to the center.

Upon coupling the motor assembly 260 to the adapter 230, the driving shaft 263 may be fitted into the shaft coupling hole 233.

There may be formed a plurality of auxiliary coupling holes 234 along the outer circumference of the motor coupling part 232, and fastening members 235, e.g., screws, bolts, or rivets, may be fitted into the auxiliary coupling holes 234 to assist in a firm axis-to-axis coupling between the driving shaft 263 and the motor coupling part 232.

The driving shaft 263 may have a cross section shaped as non-circular for anti-slip purposes. For example, the cross section of the driving shaft 263 may be formed in a D-cut or rectangular shape or other various shapes, for preventing the driving shaft 263 from slipping on the surface abutting the motor coupling part 232 when axially rotating.

Referring to FIGS. 2, 3A, and 3B, according to an embodiment, the hinge assembly 200 may include a third connecting member 250. The third connecting member 250 may be connected to an end of the motor assembly 260 and may include a third coupling piece 251 coupled to the main body 120 and a third arm 252 extending from the third coupling piece 251 and connected to the motor assembly 260. The third arm 252 may be perpendicular to an end of the third coupling piece 251 as shown in FIG. 2. Like the first coupling piece 211, the third coupling piece 251 may be shaped as a plate and may be fastened and connected to the main body 120 via at least one coupling scheme of screws, bolts, or rivets. One end of the third arm 252 may have a through hole where the driving shaft 263 is positioned to share the rotation axis.

The third connecting member 250 may be prepared to firmly fasten the motor assembly 260 to the main body 120. The third arm 252 may be firmly connected to one side of the motor assembly 260, e.g., one side of the decelerating part 262, and the third coupling piece 251 may be firmly connected to the main body 120. Providing the third connecting member 250 may minimize vibration or noise that may be caused while the motor assembly 260 is driven under electrical control.

Figure 5A:
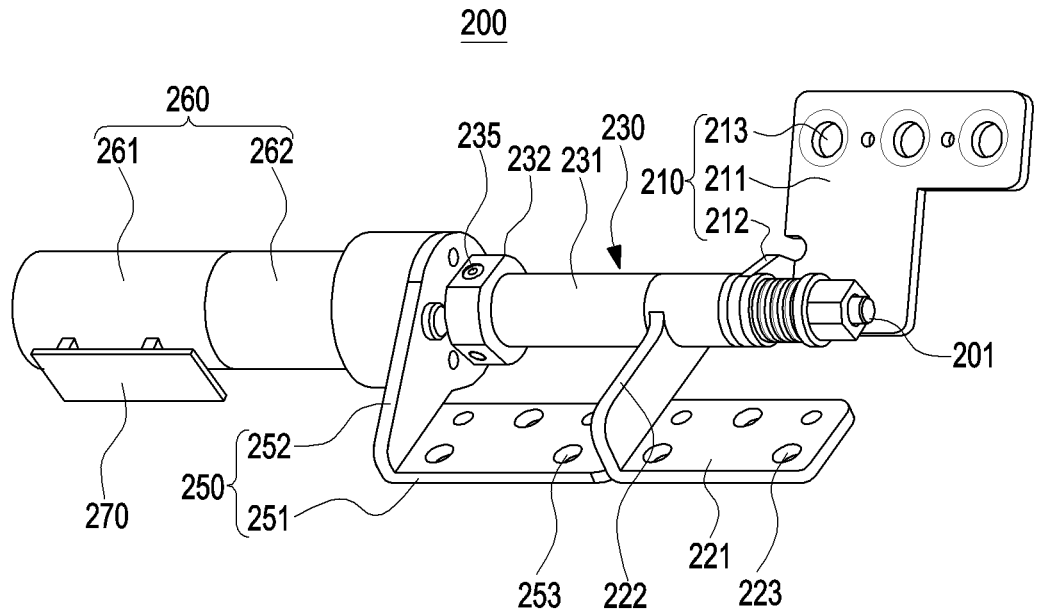
FIG. 5A is a perspective view of a hinge assembly, according to an embodiment.
Figure 5B:
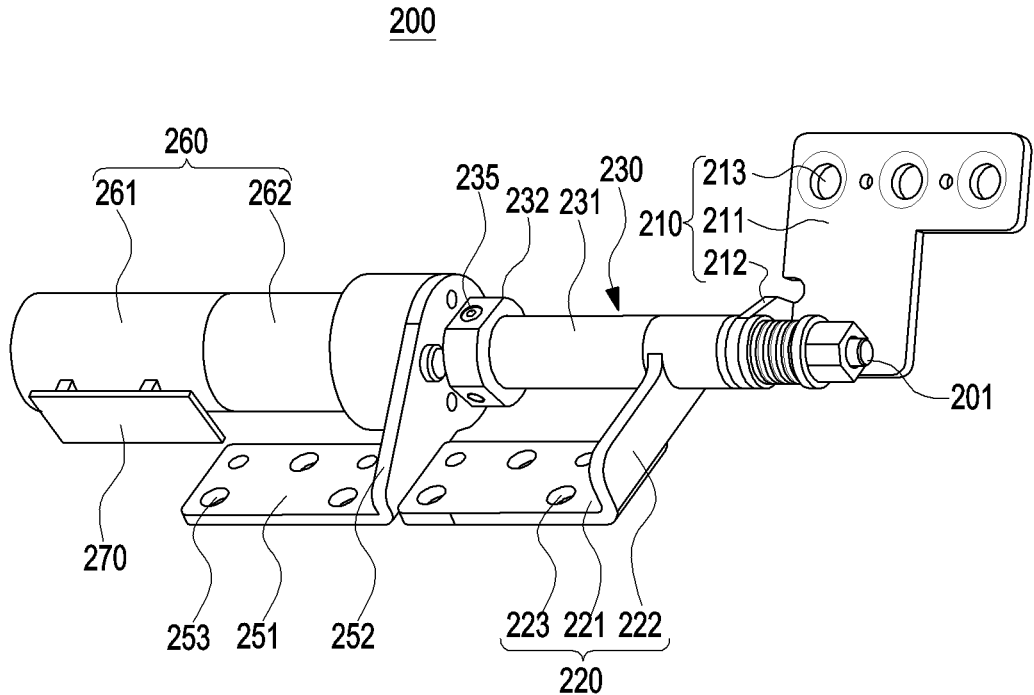
FIG. 5B is a perspective view of a hinge assembly, according to an embodiment.

FIG. 5A is a perspective view of the hinge assembly, according to an embodiment. FIG. 5B is also a perspective view of the hinge, according to an embodiment.

Referring to FIGS. 2, 5A, and 5B, the third coupling piece 251 may be positioned on the second base (e.g., 124 of FIG. 2) inside the second housing 121. FIGS. 5A and 5B illustrate examples in which the third coupling piece 251 and the second coupling piece 221 are coupled in different positions on the second base (e.g., 124 of FIG. 2). When the hinge assembly 200 is disposed inside the second housing 121 of the electronic device (e.g., 100 of FIG. 1), the second coupling piece 221 and the third coupling piece 251 may be fastened by a predetermined number of connecting members (e.g., screws, bolts, or rivets) in different positions.

The third coupling piece 251 may be positioned to face the second coupling piece 221, and at least part of the third coupling piece 251 may be positioned to overlap at least part of the second coupling piece 221 as shown in FIG. 2. Accordingly, the area in which the second coupling piece 221 and the third coupling piece 251 are positioned on the second base (e.g., 124 of FIG. 2) may be reduced. The third coupling piece 251 and the second coupling piece 221 may be fastened to the main body 120 via the same connecting member (e.g., screws, bolts, or rivets). A third coupling hole 253 and a second coupling hole 223 are designed to be aligned with each other so when the third coupling piece 251 and the second coupling piece 221 overlap each other, the third coupling piece 251 and the second coupling piece 221 may be fastened to the main body 120 via the same coupling member.

Upon connecting the first connecting member 210 and the second connecting member 220 to the first shaft 201, the first arm 212 may be coupled to be rotatable when the first shaft 201 rotates, and the second arm 222 may be coupled to idle on the first shaft 201. The second coupling piece 221 and the third coupling piece 251 may be overlappingly fastened, with the third arm 252 fastened to the motor assembly 260. In this case, while the first arm 212 rotates dependent upon the first shaft 201, the second arm 222 may not rotate despite the rotation of the first shaft 201. Thus, a side of the second connecting member 220 may be stably fastened to the main body (e.g., 120 of FIG. 1), and the opposite side thereof may support the peripheral part of the first shaft 201, thereby reinforcing the coaxial-stiffness of the hinge assembly 200 extending long along one direction (e.g., a horizontal direction).

In addition to the above-described components, the electronic device 100 may include a frictional torque part 240 prepared to produce frictional torque when the first shaft 201 axially rotates and, at least partially, surrounding the outer circumference of the first shaft 201. The frictional torque part 240 may produce frictional torque in the first connecting member 210. For example, the frictional torque part 240 may be disposed between an end of the first shaft 201 and the first arm 212 of the first connecting member 210 to provide a frictional force when the first shaft 201 axially rotates, thereby preventing a slip between the first shaft 201 and the first arm 212 or between the first arm 212 and the second arm 222. The frictional torque part 240 may put friction on the first arm 212 when the first arm 212 rotates as the first shaft 201 rotates. For example, a plurality of leaf springs may be put together side-by-side and, as a rotational force is provided from the motor assembly 260 to rattle the first shaft 201, the leaf springs may be compressed to produce frictional torque.

In the electronic device (e.g., 100 of FIG. 1), torque may be produced at the motor assembly 260 and the frictional torque part 240. The torque produced at the motor assembly 260 (motor torque) may be subject to electrical control and may be rendered to actively increase or decrease. In contrast, the torque produced at the frictional torque part 240 (frictional torque) may be varied depending on, e.g., the rotational speed of the first shaft 201, the degree of fitting between the first shaft 201 and an arm (e.g., the first arm 212), the state of wear, and the friction coefficient of the frictional torque part 240, and may be passively implemented. The motor torque may be increased or decreased according to, e.g., a value input to a motor controller 270, and the frictional torque may be rendered to work differently by, e.g., a force applied by the user when the display unit 110 and the main body 120, which are in a folded position (closed state), open. Unless the motor torque is greater than the frictional torque in the closed state of the electronic device (e.g., 100 of FIG. 1), the electronic device might not be open although an electrical control input is given. Accordingly, such a setting may be made as to enable the motor torque to be greater than the frictional torque to implement a scenario to open the electronic device by electrical control.

Referring to FIG. 2, according to an embodiment, the electronic device (e.g., 100 of FIG. 1) may include a motor controller 270 which controls the motor assembly 260. The motor controller 270 may be a control element such as a microcomputer (micom) or printed circuit board (PCB) included in the main body 120 or part of the control element such as a micom or PCB. The motor controller 270 may receive signals from a first sensor module (e.g., 130 of FIG. 6) and a second sensor module (e.g., 140 of FIG. 7) described below and the motor controller 270 may control the motor assembly 260.

The motor controller 270 may be electrically connected with the motor assembly 260 and, alternatively, be positioned physically adjacent to the motor assembly 260 as shown in FIG. 2. The driving motor part 261 may be rotated through the motor controller 270. As the driving motor part 261 rotates, the driving shaft 263 may rotate in a number of turns which has been adjusted into a predetermined deceleration rate by the decelerating part 262.

Figure 6:
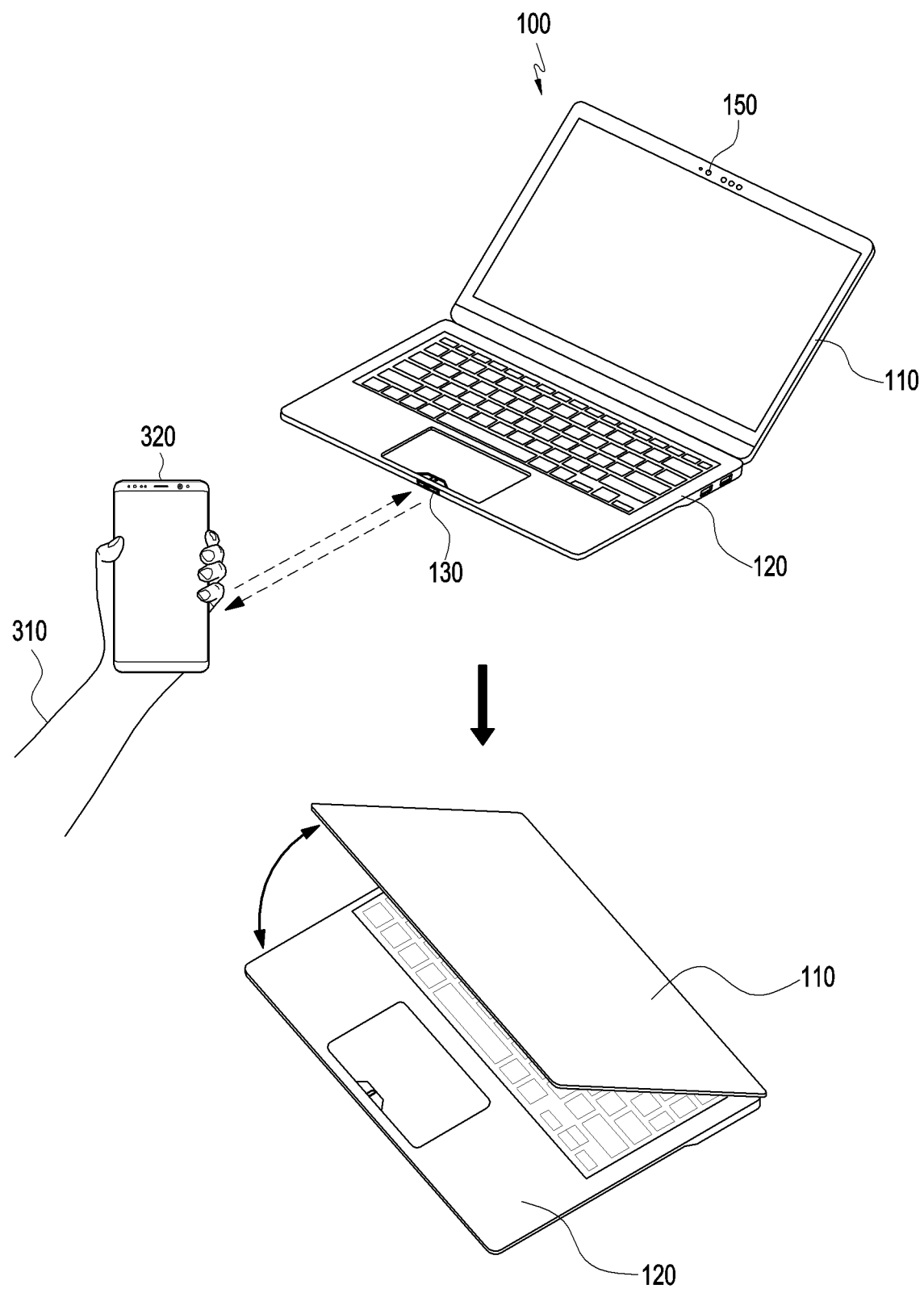
FIG. 6 is an illustration of operations of an electronic device with a hinge assembly, according to an embodiment.
Figure 7:
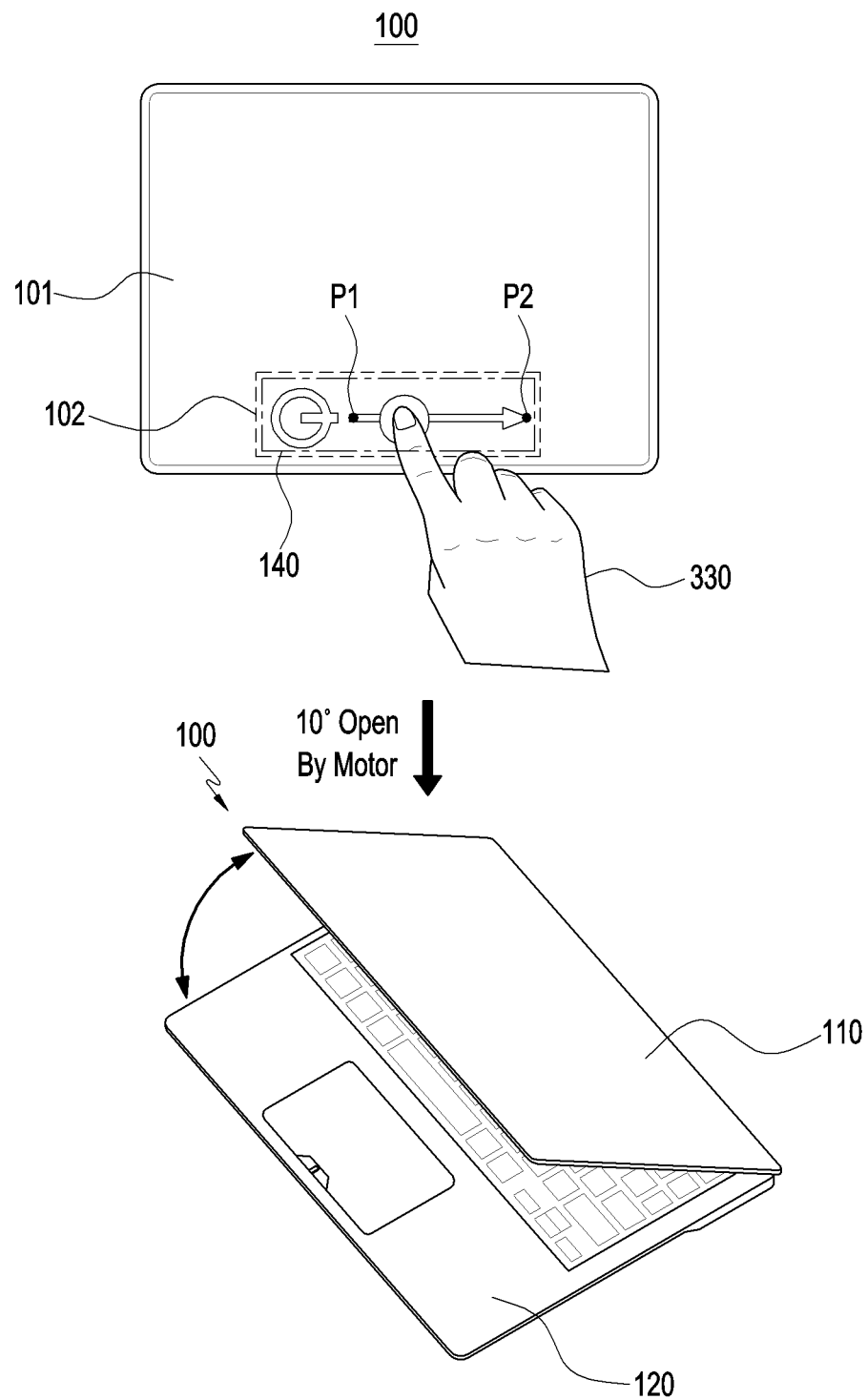
FIG. 7 is an illustration of an electronic device with a hinge assembly, according to an embodiment.
Figure 8:
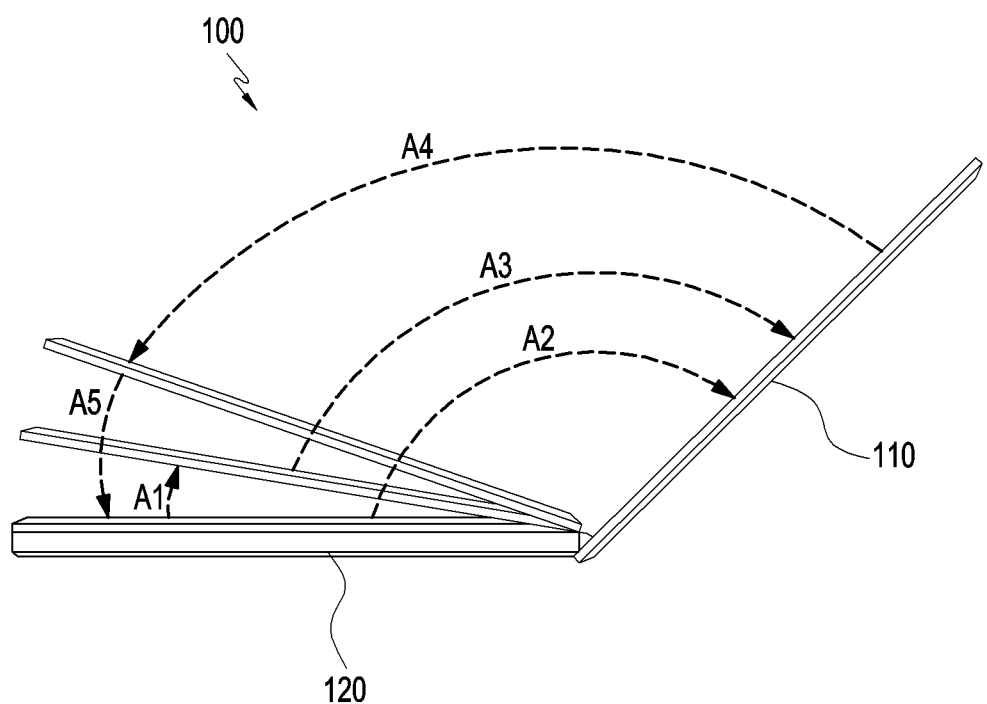
FIG. 8 is an illustration of opening/closing, or adjusting an angle of, an electronic device, according to an embodiment.

FIG. 6 is an illustration of operations of an electronic device with a hinge assembly, according to an embodiment. FIG. 7 is an illustration of operations of the electronic device with the hinge assembly, according to an embodiment. FIG. 8 is an illustration of opening/closing, or adjusting an angle of opening of, the electronic device, according to an embodiment.

Referring to FIGS. 1, 6, and 7, the display unit 110 or the main body 120 may include a first sensor unit 130 to detect a motion of an external object (e.g., a user) and the second sensor unit (e.g., 140 of FIG. 6) to detect a touch or hover input.

The electronic device 100 may include at least one first sensor unit 130. The first sensor unit 130 may be embedded in at least one of the first housing 111 or the second housing 121. For example, the first sensor unit 130 may be provided only in the second housing 121 or in each of the first housing 111 and the second housing 121. The first sensor unit 130 may be installed ahead of the second housing 121, e.g., on the front surface of the second housing 121 around the touch pad 123.

According to an embodiment, the first sensor unit 130 may include, e.g., an infrared (IR) sensor module, a camera module, a proximity illuminance sensor, a Hall effect sensor, or other proximity sensor modules. For example, when the first sensor unit 130 includes an IR sensor, the first sensor unit 130 may include a light emitting part 131 to emit IR beams, a light receiving part 132 to receive IR beams, and an IR sensor integrated circuit (IC) to process the input.

Referring to FIG. 6, in a case where the first sensor unit 130 includes an IR sensor, as an external object approaches, the IR sensor IC may provide information, which is based on the amount of IR light emitted from the light emitting part 131 and the amount of light received, to a processor disposed inside the electronic device 100, estimate the motion of the external object based thereupon, and generate a first event to control the motor assembly 260 according to the estimated motion of the external object.

The first event may be a predesignated scenario demanded by the user, e.g., an event to initially open the electronic device 100.

The external object may be at least part (e.g., 310 of FIG. 6) of a user's body or an external electronic device 320. As an approach, to the electronic device 100, of part (e.g., 310 of FIG. 6) of the user's body is detected, the first event may be generated. Alternatively, the first event may be generated by detecting an approach of an external electronic device 320 capable of (e.g., wirelessly) communicating with the electronic device 100 (e.g., using a scheme such as Bluetooth™).

The electronic device 100 may include at least one second sensor unit 140. The second sensor unit 140 may be embedded in at least one of the first housing 111 or the second housing 121, with the surface of at least part thereof exposed to the outside.

Referring to FIG. 7, a sensing area 102 may be set in one surface 101 of the first housing 111 or second housing 121 of the electronic device 100. The second sensor unit 140 may be disposed in the sensing area 102 and may further include touch circuitry. The touch circuitry (e.g., the camera module 150) may include a touch sensor and a touch sensor IC to control the touch sensor. The touch sensor IC may control the touch sensor to sense a touch input or a hovering input in, e.g., the sensing area 102. For example, the touch sensor IC may detect a touch input or hovering input by measuring a change in a signal (e.g., voltage, quantity of light, resistance, or quantity of electric charges) on one surface 101 of the first housing 111 or the second housing 121. The touch sensor IC may provide information regarding the detected touch or hovering input (e.g., position, area, pressure, or time) to a processor (not shown) disposed inside the electronic device 100 and generate a second event to control the motor assembly 260 therethrough.

The second event may be a predesignated scenario demanded by the user, e.g., an event to adjust the opening angle of the electronic device 100. Alternatively, like the first event, the second event may be the initial open event of the electronic device 100.

The sensing area 102 may be formed in one surface 101 (e.g., a front and lower surface) of the electronic device 100 as shown in FIG. 7, but is not limited thereto. For example, the sensing area 102 may be formed in a side surface or edge of the electronic device 100.

When a user touches the electronic device 100 with a finger 330, e.g., when swiping on the sensing area 102 from point P1 to point P2 as shown in FIG. 7, the electronic device 100 may adjust the opening angle between the display unit 110 and the main body 120 according to the user's input. Corresponding to the distance of the swipe from point P1 to point P2, the opening angle between the display unit 110 and the main body 120 may actively be adjusted. For example, a long swipe from point P1 to point P2 may increase the opening angle between the display unit 110 and the main body 120 (e.g., to 90 degrees) while a short swipe from P1 to P2 may reduce the opening angle between the display unit 110 and the main body 120 (e.g., to 10 degrees).

The second sensor unit 140 may include a biometric sensor (e.g., a fingerprint sensor or iris sensor), as well as the touch sensor. When the second sensor unit 140 includes both a touch sensor and a fingerprint sensor, such an implementation may be made as to generate the second event only when the user's fingerprint is recognized and detected while the user's touch is recognized.

FIG. 8 is an illustration where an opening angle of the electronic device is adjusted, according to an embodiment. The opening angle may be an angle between the display unit 110 and the main body 120 of the electronic device 100.

The electronic device 100 may be opened to various angles, e.g., A1, A2, and A3 and may be closed to various angles, e.g., A4 and A5, through the first event or the second event, as shown in FIG. 8. The opening and closing may be performed continuously or discretely at a time gap as the first event or second event occurs.

The first event and the second event may be an event that occurs after the initial opening of the electronic device 100. For example, the opening angle of the electronic device 100 may arbitrarily be controlled manually even after the initial opening is done. In this case, a functional implementation may be made using the hinge assembly 200 according to the disclosure, thereby enabling electronic control in various manners.

Besides the first sensor unit 130 or the second sensor unit 140, the camera module (e.g., 150 of FIG. 6) provided in the electronic device 100 may be used to perform various operations.

For example, such a setting may be made as to close unless the electronic device 100 is manually opened within a certain time after an initial opening, a user's face may be detected by an embedded camera module in an initial 90-degree open position, and the hinge assembly (e.g., 200 of FIG. 1) may be driven to allow the user's face to be positioned in the center of the screen captured by the camera module. By using the electronic device (e.g., 100 of FIG. 1), the user's face may be recognized by the camera module and, when the user is determined to not be a designated user, the display unit (e.g., 110 of FIG. 1) may automatically close. When the presence of the user is recognized by the camera module but the user is detected to be away from the electronic device 100 for a predetermined time, the display unit (e.g., 110 of FIG. 1) may be closed automatically. Alternatively, the display unit (e.g., 110 of FIG. 1) may be closed after an operating system (OS) of the computer is shut down.

According to an embodiment of the present disclosure, an electronic device (e.g., 100 of FIG. 1) may include a main body (e.g., 120 of FIG. 1), a display unit (e.g., 110 of FIG. 1) rotatably coupled with the main body 120, and a hinge assembly (e.g., 200 of FIG. 1) including a motor assembly (e.g., 260 of FIG. 1) disposed on at least a portion of an end thereof and rotatably couple the display unit 110 to the main body 120, wherein the hinge assembly 200 includes: a first shaft (e.g., 201 of FIG. 2) providing a rotation axis to the display unit 110, a first connecting member (e.g., 210 of FIG. 1) including a first coupling piece (e.g., 211 of FIG. 2) coupled to the display unit 110 and a first arm (e.g., 212 of FIG. 2) extending from the first coupling piece 211 and sharing the rotation axis with the first shaft 201; a second connecting member (e.g., 220 of FIG. 1) including a second coupling piece (e.g., 221 of FIG. 2) coupled to the main body 120 and a second arm (e.g., 222 of FIG. 2) extending from the second coupling piece 221 and sharing the rotation axis with the first shaft 201; and an adapter (e.g., 230 of FIG. 1) connecting the motor assembly 260 with the first shaft 201.

The motor assembly 260 may be coaxially coupled with the first shaft 201 via the adapter 230, and the first shaft 201 may be configured to be rotated in synchronization with rotation of the motor assembly 260.

The adapter 230 may include a second shaft (e.g., 231 of FIG. 2). An end of the second shaft 231 may be coaxially coupled with the first shaft 201.

A motor coupling part (e.g., 232 of FIG. 2) to mutually couple the adapter 230 and the motor assembly 260 may be formed at another end of the second shaft 231. A shaft coupling hole (e.g., 233 of FIG. 4A) where a driving shaft 263 of the motor assembly 260 may be coaxially coupled with the second shaft 231 may be formed in a center of the motor coupling part 232. An auxiliary coupling hole (e.g., 234 of FIG. 4A) may be formed to penetrate from an outer circumference of the motor coupling part 232 to the center.

A cross section of the driving shaft 263 may have a non-circular shape to prevent a slip.

The second shaft 231 may be integrally formed with the first shaft 201.

The electronic device 100 may further comprise a third connecting member 250 connected to an end of the motor assembly 260 and including a third coupling piece 251 coupled to the main body 120 and a third arm 252 extending from the third coupling piece 251 and connected to the motor assembly 260.

The third coupling piece 251 may face the second coupling piece 221. At least a portion of the third coupling piece 251 may be disposed to overlap at least a portion of the second coupling piece 221.

The third coupling piece 251 and the second coupling piece 221 may be attached to the main body 120 by the same coupling member.

The first arm 212 may be coupled to be rotatable when the first shaft 201 rotates, the second arm 222 may be coupled to idle on the first shaft 201, and the third arm 252 may be fixed to the motor assembly 260.

The electronic device 100 may include a frictional torque part (e.g., 240 of FIG. 2) provided to surround at least part of an outer circumference of the first shaft 201 and produce frictional torque in the first connecting member when the first shaft 201 axially rotates.

The motor assembly 260 may include a driving motor part (e.g., 261 of FIG. 2) and a decelerating part (e.g., 262 of FIG. 2).

The motor assembly 260 may include a motor controller (e.g., 270 of FIG. 2) configured to control the motor assembly 260.

The display unit 110 or the main body 120 may include a first sensor unit (e.g., 130 of FIG. 1) configured to detect a motion of an external object. The motor controller 270 may be configured to generate a first event to control the motor assembly 260 using information received through the first sensor unit 130.

The display unit 110 or the main body 120 may include a second sensor unit (e.g., 140 of FIG. 6) configured to detect a touch input or a hovering input. The motor controller 270 may be configured to generate a second event to control the motor assembly 260 using information received through the second sensor unit 140.

A hinge assembly (e.g., 200 of FIG. 2) having a motor assembly (e.g., 260 of FIG. 2) includes a first shaft (e.g., 201 of FIG. 2) providing a rotation axis, a first connecting member (e.g., 210 of FIG. 2) including a first coupling piece (e.g., 211 of FIG. 2) coupled to a first object (e.g., the display unit 110 of FIG. 1) and a first arm (e.g., 212 of FIG. 2) extending from the first coupling piece 211 and sharing the rotation axis with the first shaft 201, a second connecting member (e.g., 220 of FIG. 2) including a second coupling piece (e.g., 221 of FIG. 2) coupled to a second object (e.g., the main body 120 of FIG. 1) and a second arm (e.g., 222 of FIG. 2) extending from the second coupling piece 221 and sharing the rotation axis with the first shaft 201, and an adapter (e.g., 230 of FIG. 2) connecting the motor assembly 260 with the first shaft 201. The motor assembly 260 may include a driving motor part (e.g., 261 of FIG. 2), a decelerating part (e.g., 262 of FIG. 2) configured to decelerate rotation of the driving motor part 261, and a driving shaft (e.g., 263 of FIG. 3A) receiving a rotational force of the driving motor part 261 through the decelerating part 262. The driving shaft 263 may be coaxially coupled with the first shaft 201 via the adapter 230. The first shaft 201 may be rotated in synchronization with rotation of the driving shaft 263.

The adapter 230 may include a second shaft (e.g., 231 of FIG. 2). One end of the second shaft 231 may be coaxially coupled with the first shaft 201. A motor coupling part (e.g., 232 of FIG. 2) to mutually couple the adapter 230 and the motor assembly 260 may be formed at another end of the second shaft 231. The second shaft 231 may be coaxially coupled with the driving shaft 263 through the motor coupling part 232.

The hinge assembly may further include a third connecting member (e.g., 250 of FIG. 2) connected to an end of the motor assembly 260 and including a third coupling piece (e.g., 251 of FIG. 2) coupled to the second object (e.g., the main body 120 of FIG. 1) and a third arm (e.g., 252 of FIG. 2) extending from an end of the third coupling piece 251 and connected to the motor assembly 260. The third coupling piece 251 may face the second coupling piece 221. At least part of the third coupling piece 251 may be positioned to overlap at least part of the second coupling piece 221.

According to an embodiment, an electronic device (e.g., 100 of FIG. 1) including a hinge assembly (e.g., 200 of FIG. 1) includes a main body (e.g., 120 of FIG. 1), a display unit (e.g., 110 of FIG. 1) rotatably coupled with the main body 120, and a hinge assembly 200 where the display unit 110 is rotatably coupled with the main body 120, a motor assembly (e.g., 260 of FIG. 1) sharing a rotation axis with the hinge assembly 200 and including a driving motor part (e.g., 261 of FIG. 1) and a decelerating part (e.g., 262 of FIG. 1) configured to decelerate rotation of the driving motor part 261, and a motor controller 270 configured to control the motor assembly 260. The display unit 110 or the main body 120 may include a first sensor unit (e.g., 130 of FIG. 1) configured to detect a motion of an external object and a second sensor unit (e.g., 140 of FIG. 6) configured to detect a touch input or a hovering input, and the motor controller 270 may be configured to generate a first event to control the motor assembly 260 using information received through the first sensor unit 130 and a second event to control the motor assembly 260 using information received through the second sensor unit 140.

The first event and the second event may be events to adjust an angle between the main body 120 and the display unit 110.

The embodiments disclosed herein are provided for understanding of the present disclosure but are not intended to limit the scope of the present disclosure. Accordingly, the scope of the present disclosure is intended to be interpreted as including all changes or various embodiments based on the scope and spirit of the present disclosure.

While the present disclosure has been shown and described with reference to embodiments thereof, it will be apparent to those of ordinary skill in the art that various changes in form and detail may be made thereto without departing from the scope of the present disclosure as defined by the appended claims and their equivalents.

What is claimed is:

1. An electronic device, comprising:
a main body;
a display unit rotatably coupled with the main body;
a hinge assembly including a motor assembly disposed on at least a portion of an end thereof and configured to rotatably couple the display unit to the main body, wherein the hinge assembly comprises:
a first shaft configured to provide a rotation axis to the display unit;
a first connecting member comprising a first coupling piece coupled to the display unit and a first arm extending from the first coupling piece and sharing the rotation axis with the first shaft; and
a second connecting member comprising a second coupling piece coupled to the main body and a second arm extending from the second coupling piece and sharing the rotation axis with the first shaft, and an adapter connecting the motor assembly with the first shaft, and
a third connecting member connected to an end of the motor assembly and including a third coupling piece coupled to the main body and a third arm extending from the third coupling piece and connected to the motor assembly,
wherein the third coupling piece is configured to face the second coupling piece, and
wherein at least a portion of the third coupling piece is disposed to overlap at least a portion of the second coupling piece.

2. The electronic device of claim 1, wherein the motor assembly is coaxially coupled with the first shaft via the adapter, and wherein the first shaft is configured to rotate with rotation of the motor assembly.

3. The electronic device of claim 1, wherein the adapter comprises a second shaft, and wherein an end of the second shaft is coaxially coupled with the first shaft.

4. The electronic device of claim 3, further comprising:
a motor coupling part configured to mutually couple the adapter and the motor assembly is formed at another end of the second shaft;
a shaft coupling hole, where a driving shaft of the motor assembly is coaxially coupled with the second shaft, formed in a center of the motor coupling part; and
an auxiliary coupling hole formed to penetrate from an outer circumference of the motor coupling part to the center of the motor coupling part.

5. The electronic device of claim 4, wherein the driving shaft is configured to have a cross section with a non-circular shape to prevent slippage.

6. The electronic device of claim 3, wherein the second shaft is integrally formed with the first shaft.

7. The electronic device of claim 1, wherein the third coupling piece and the second coupling piece are attached to the main body by a same coupling member.

8. The electronic device of claim 1, wherein the first arm is configured to rotate when the first shaft rotates, the second arm is configured to idle on the first shaft, and the third arm is fixed to the motor assembly.

9. The electronic device of claim 1, further comprising a frictional torque part configured to surround at least part of an outer circumference of the first shaft and produce frictional torque in the first connecting member when the first shaft axially rotates.

10. The electronic device of claim 1, wherein the motor assembly comprises a driving motor part and a decelerating part.

11. The electronic device of claim 1, further comprising a motor controller configured to control the motor assembly.

12. The electronic device of claim 11, wherein the display unit or the main body includes a first sensor unit configured to detect a motion of an external object, and wherein the motor controller is further configured to generate a first event to control the motor assembly using information received through the first sensor unit.

13. The electronic device of claim 11, wherein the display unit or the main body includes a second sensor unit configured to detect a touch input or a hovering input, and wherein the motor controller is further configured to generate a second event to control the motor assembly using information received through the second sensor unit.

14. A hinge assembly including a motor assembly, comprising:
a first shaft configured to provide a rotation axis;

a first connecting member comprising a first coupling piece coupled to a first object and a first arm extending from the first coupling piece and sharing the rotation axis with the first shaft;

a second connecting member comprising a second coupling piece coupled to a second object and a second arm extending from the second coupling piece and sharing the rotation axis with the first shaft;

a third connecting member connected to an end of the motor assembly and including a third coupling piece coupled to the main body and a third arm extending from the third coupling piece and connected to the motor assembly; and an adapter connecting the motor assembly with the first shaft, wherein the motor assembly comprises:

a driving motor part;

a decelerating part configured to decelerate rotation of the driving motor part, and a driving shaft configured to receive a rotational force of the driving motor part through the decelerating part, wherein the driving shaft is coaxially coupled with the first shaft via the adapter, and wherein the first shaft is configured to rotate with rotation of the driving shaft, wherein the third coupling piece is configured to face the second coupling piece, and wherein at least a portion of the third coupling piece is disposed to overlap at least a portion of the second coupling piece.

15. The hinge assembly of claim 14, wherein the adapter comprises a second shaft, wherein one end of the second shaft is coaxially coupled with the first shaft, further comprising a motor coupling part, configured to mutually couple the adapter and the motor assembly, formed at another end of the second shaft, and wherein the second shaft is coaxially coupled with the driving shaft through the motor coupling part.

16. An electronic device including a hinge assembly, comprising:

a main body;

a display unit rotatably coupled with the main body; and the hinge assembly, wherein the display unit is rotatably coupled with the main body;

a motor assembly sharing a rotation axis with the hinge assembly and comprising a driving motor part and a decelerating part configured to decelerate rotation of the driving motor part; and a motor controller configured to control the motor assembly, wherein the display unit or the main body comprises a first sensor unit configured to detect a motion of an external object and a second sensor unit configured to detect a touch input or a hovering input, wherein the motor controller is further configured to generate a first event to control the motor assembly using information received through the first sensor unit and a second event to control the motor assembly using information received through the second sensor unit, wherein the first sensor unit is configured to sense an approach of an external object, and wherein the first event is generated to initially open the electronic device.

17. The electronic device of claim 16, wherein the first event and the second event are events to adjust an angle between the main body and the display unit.

* * * * *